Figure 1A:
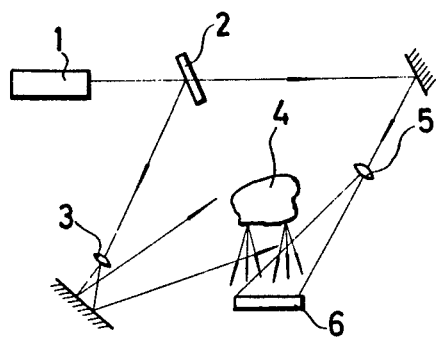

OR 3,826,555

United States Patent
Matsumoto

[11] 3,826,555
[45] July 30, 1974

[54] HOLOGRAPHIC CAMERA FOR FORMING PLANAR OR VOLUME HOLOGRAMS

[75] Inventor: Kazuya Matsumoto, Yokohama, Japan

[73] Assignee: Canon Kabushiki Kaisha, Tokyo, Japan

[22] Filed: Mar. 2, 1972

[21] Appl. No.: 231,431

Related U.S. Application Data

[63] Continuation of Ser. No. 55,453, July 16, 1970, abandoned.

[30] Foreign Application Priority Data

July 21, 1969  Japan.............................. 44-57299

[52] U.S. Cl.................................. 350/3.5, 350/173
[51] Int. Cl. ........................................ G02b 27/00
[58] Field of Search ............ 350/3.5, 169, 173, 204, 350/286

[56] References Cited
UNITED STATES PATENTS
2,314,392   3/1943   Dimmick ........................... 350/173
3,521,944   7/1970   Kishikana .......................... 350/173
3,530,442   9/1970   Collier et al........................ 350/3.5
3,560,071   2/1971   Silverman et al.................... 350/3.5

OTHER PUBLICATIONS

Pennington, "Microwaves," Oct. 1965, pp. 35–40.
Dickinson et al., "Wireless World," Vol. 73, No. 2, Feb. 1967, pp. 56–61.

*Primary Examiner*—Ronald J. Stern
*Attorney, Agent, or Firm*—Toren & McGeady

[57] ABSTRACT

A holography device which comprises a beam splitter arranged in the optical path of an incident beam from a beam source, said beam splitter splitting said incident beam into at least three beams, i.e., at least one transmitted beam and at least two reflected beams, said transmitted beam and at least one of said reflected beams being used as illuminating beam for the object and the other reflected beam being used as a reference beam, said object transferring its illuminating beam into a signal beam.

8 Claims, 4 Drawing Figures

INVENTOR.
KAZUYA MATSUMOTO
BY
ATTORNEYS

HOLOGRAPHIC CAMERA FOR FORMING PLANAR OR VOLUME HOLOGRAMS

This is a continuation of application Ser. No. 55,453 filed July 16, 1970, now abandoned.

The present invention relates to an improvement of a holography device, particularly to a holography device which comprises a beam splitter arranged in the optical path of an incident beam from a beam source, said beam splitter splitting said incident beam into at least three beams, i.e., at least one transmitted beam and at least two reflected beams, said transmitted beam and at least one of said reflected beams being used as illuminating beam for the object and the other reflected beam being used as a reference beam, said object transferring its illuminating beam into a signal beam and to a camera and a viewer making use of the camera, wherein the camera is so constructed, that it may be easily used as a viewer for a planar hologram as well as adapted to the photographing of both of planar and volume holograms, and in case of illuminating an object to be photographed, a signal beam from the object may enter into the camera witout being disturbed or vignetted by the object.

The characteristics of the improvement resides in the following points: namely the camera is so constructed that a beam splitter is arranged in the optical path of an incident beam from a beam source to split the incident beam into three beams, i.e. a transmitted beam and reflected beams which latter beams are so reflected on both sides of the incident beam as to put the incident beam between the reflected beams, and the transmitted beam and one of the two reflected beams are respectively used as an illuminating beam, for the object and the other reflected beam is used as a reference beam; the camera is so constructed that any of planar hologram and volume hologram may be photographed by changing-over the optical path of reference beam using a switching means such as a mirror; and it is so constructed that a planar hologram recorded by the camera may be arranged in an optical path of the illuminating beam for the object.

Before entering to the detailed explanation about an embodiment of the present invention, a brief explanation about a conventionally known holography camera will be given, as follows.

Generally, a holographic camera is so constructed that a laser beam is divided into two by a beam splitter and one of them is directed onto an object as a diverging beam by means of a lens, and a reflected beam with a signal wave front of the object or a transmitted beam with a signal wave front of the object is directed onto a sensitive face and the other of the divided beams by the beam splitter is directed onto the sensitive face as a diverging beam by means of another lens. The latter beam is called as a reference beam, and the beam entering the sensitive face from the object which is called as a signal beam and the reference beam are interfered each other on the sensitive face to make an interference fringe pattern corresponding to the object to be photographed. The recorded interference fringe pattern is called as a hologram.

The present invention will be described in detail in reference to the attached drawings in which FIGS. 1 a and b show the construction of conventionally known holography camera, and in case of FIG. 1 a a planar hologram is photographed and in case of FIG. 1 b a volume hologram is photographed.

Figure 2:
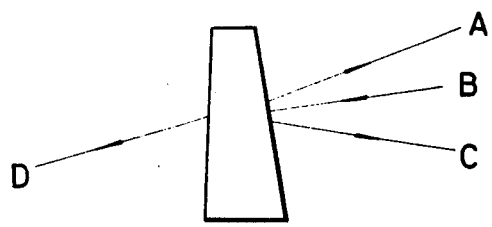

FIG. 2 exemplifies a beam splitter of a holography device according to the present invention.

Figure 3:
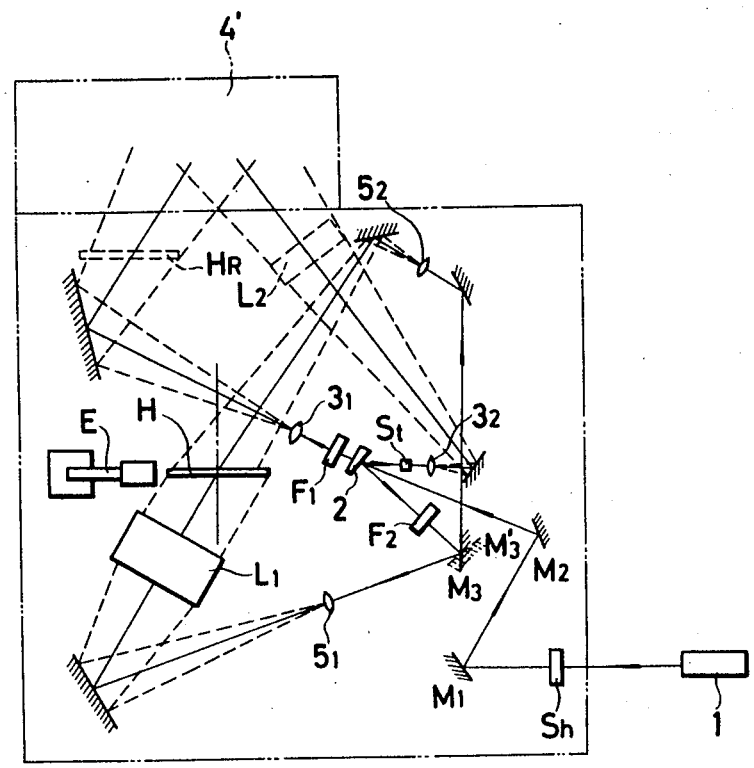

FIG. 3 shows a concrete construction of an embodiment of the present invention.

Figure 1B:
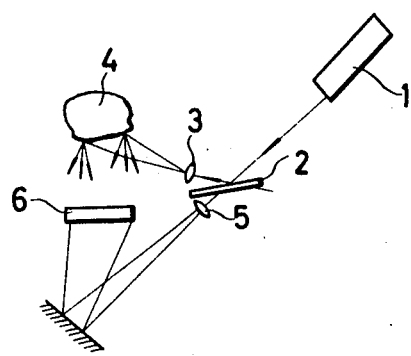

The concrete arrangement of the conventional holography camera is shown in FIG. a and FIG. 1 b. In the drawings, 1 denotes a laser device, 2 a beam splitter, 3 a lens for diverging a beam from the laser device, 4 an object, 5 a lens for diverging a reference beam and 6 a sensitive plate.

In the arrangement of FIG. 1 a, the beam from the object and the reference beam enter from the same side relative to the sensitive plate, and a hologram made by such an arrangement is called as a planar hologram, while, in the arrangement of FIG. 1 b, two beams enter from opposite sides relative to the sensitive plate, and a hologram made by such an arrangement is called as a volume hologram.

The difference between these two types of holograms is in that in the former, no regenerated image is obtained unless a beam with higher coherency such as a laser beam is used, while in the latter, a regenerated image is easily obtained even with an incoherent white light such as sun light.

In the prsent invention a simply operable holography device, with features of both the planar holography and the volume holography as explained above is presented with a compact construction.

A single device for photographing these two types of holograms requires following three conditions.

i. The reference beam is directed onto a sensitive plate such as a sensitive sheet, a film, a roll film and a semiconductor sensitive from either one side by changing over a switching means such as a mirror.

ii. Each beam divided by the beam splitter must have equal length of optical path from the beam splitter to a photographic plate holder.

iii. The distance from the object to the sensitive plate is equal to the distance from the condensing point of the beam to the sensitive plate in case when the beam condensed by a lens diverges and reaches the sensitive plate.

Further, as a illuminating beam for the object, it is desirable to illuminate the object from two positions, because the object is shaded and the whole parts thereof cannot be lightened brightly, when it is illuminated from one position.

It is also desirable that the reconstruction of planar (two-dimensional) hologram may be made by means of the camera device, however, in this case, following two conditions are required further.

iv. The illuminating beam for the reconstruction enters on the planar hologram in the same angular direction as the angular direction in which the reference beam enters onto the photographic plate in case of photographing the hologram.

v. The distance from the condensing point of the reference beam to the sensitive plate in case of photographing the hologram is equal to the distance from the condensing point of the illuminating beam to the hologram face.

In the next place, the explanation about the beam splitter for the device will be given, as follows.

For illuminating an object from two positions, the beam splitter must have a function to divide the incident beam into three, including the reference beam.

To effect such dividing into three beams, a prism as shown in FIG. 2 may be used. One beam is reflected on the incident face of the prism and one portion of the transmitted beam is reflected on the exit face of the prism, thus two beams are reflected in opposite side directions to the incident beam direction.

Namely, there exist three beams on the incident side of the prism and one transmitted beam on the exit side of the prism.

To assure compactness of the holography device it is necessary to arrange reflecting mirrors in the respective beam. According to the condition (ii), the beam splitter is to be positioned near the sensitive plate and each of the reflecting mirrors for folding back the beams is to be positioned at a place on the optical path of each of the beams at an approximately equal distance from the beam splitter. To avoid mutual collision of frames of the reflecting mirrors, the angle formed by the beams is preferred to be rather large.

As is clear from FIG. 2, the beams under these relations are beams A and B. Let the beam B be the incident beam, the beam reflected at the incident face or the exit face be A and C, either of the beams A or C, which is nearer the object, be the illuminating beam for the object and the other beam be the reference beam, then the two reflecting mirrors for folding back may be positioned near the beam splitter, thus the device may be made compact, D denotes the transmitted beam. And, because the reflecting mirrors for folding back may be positioned near the beam splitter, the reference beam may be selectively directed to the sensitive plate or to the back of the sensitive plate simply by the change-over of the switching reflection mirror so as to satisfy the condition 1.

It is the reflecting mirror $M_3$ for folding back is positioned far away from the beam splitter, the symmetry of arrangement becomes wrong and the length of optical path of both reference beams is apt to change upon the change-over of this mirror. To avoid such an inconvenience, it becomes necessary to provide the switching mirror $M_3$ for selection especially at a proper position.

As two illuminating beams are directed in opposite directions, it is convenient to illuminate the object from two positions by reflecting these beams on the reflecting mirror.

Another feature of the present invention lies in that at the time of reconstruction of a hologram recorded by a camera provided with this beam splitter, the transmitted beam D is used.

It the hologram is put at a position satisfying the conditions (iv), (v) for the reconstruction, the reconstructed image directs to the object stage, and the reconstructed image is seen easily from the object stage without requiring any further operation to this device.

In the next place, a concrete construction of an embodiment of the present invention satisfying all of the conditions 1 through will be simply explained with reference to FIG. 3.

In FIG. 3, 1 denotes a laser device, 2' a beam splitter for with three output beams, $3_1$ and $3_2$ denote lenses for diverging beams respectively, 4' an object stage, $5_1$ and $5_2$ denote lenses for diverging reference beams, wherein $5_1$ for volume holography and $5_2$ for planar holography. Sh denotes a shutter, $M_1$ and $M_2$ denote mirrors for adjusting the relation of mutual positions between the holographic device and the laser device, $F_1$ and $F_2$ ND filters for adjusting the amount of light. $M_3$ denotes a switching mirror for changing over the photographing types of planar holography and volume holography. H denotes a beam sensitive plate, $L_1$ and collimator lens giving a plane wave, $L_2$ a collimator lens which is inserted as occasion demands. $H_R$ denotes a hologram holder for a planar hologram, St a stopper and E an exposure meter. The stopper St becomes necessary for preventing disturbing beams from entering the eyes when the device is used as a viewer.

It is conceivable that the exposure meter is always provided in the optical path and is associated with the shutter operation and the like so as to effect continuous photographing, however, in the drawing, the exposure meter is shown as it is to be changed over either inside or outside of the optical path.

What is claimed is:

1. A holography device for holographically recording an object upon a photographic plate facing the object while using a beam source, comprising beam splitter means arranged in the optical path of an incident beam from the beam source and splitting said incident beam into a transmitted output beam and first and second reflected output beams, said beam splitter means including a prism having a first surface for reflecting the incident beam before it enters the prism to form the first reflected output beam and a second surface reflecting the incident beam after it has entered the prism to form the second reflected output beam, optical control means for illuminating the object with the transmitted output beam and the first reflected output beam and simultaneously directing the second reflected output beam onto the face of the plate facing the object and alternately for illuminating the object with the transmitted and the first reflected output beams and simultaneously directing the second reflected output beam onto the face of the plate away from the object, said control means including a pair of light deflector means located respectively in the paths of the transmitted and first reflected output beams for deflecting the transmitted and first reflected output beams toward the object to be recorded holographically, the second reflected output beam forming a reference beam, and optical switching means forming a part of said control means and positioned in the optical path of the second reflected output beam for changing the direction of the second reflected output beam between a direction extending toward the face of the plate facing the object and a direction extending toward the other face of the plate, said switching means including mirror means movable between one position at which the mirror means reflects substantially all the light in the second reflected output beam in the direction toward the face of the plate facing the object and a second position at which the mirror means reflects substantially all the light in the second reflected output beam in the direction towards the other face of the plate.

2. A device as in claim 1, wherein said mirror means includes a reflecting surface movable between two angles corresponding to the two positions.

3. A device as in claim 1, wherein said beam splitter means reflects the two reflected output beams at angles to the incident beam on opposite sides of the incident beam.

4. A device as in claim 1, further comprising an object stage for positioning the object in the path of the transmitted beam and the first reflected output beam.

5. A device as in claim 4, further comprising exposure meter means in the vicinity of the plate.

6. A device as in claim 4, further comprising neutral density filters in the path of one of the output beams for varying the intensity of the one of the output beams.

7. A holography device for holographically recording an object upon a photographic plate facing the object while using a beam source, comprising beam splitter means arranged in the optical path of an incident beam from the beam source and splitting said incident beam into a first transmitted output beam and second and third reflected output beams, said beam splitter means including a prism having a first surface for reflecting the incident beam before it enters the prism to form the second beam and a second surface reflecting the incident beam after it has entered the prism to form the third beam, a pair of light deflector means located respectively in the paths of the first and second beams for deflecting the first and second beams toward the object to be recorded holographically, a neutral density filter in the path of one of the first and second beams, respective lenses in the path of each of the first and second beams for causing each of the first and second beams to diverge, an object stage for positioning the object in the path of each of the first and second beams, the third beam forming a reference beam, optical switching means positioned in the optical path of the third beam for changing the direction of the third beam between a direction extending toward a face of the plate facing the object and a direction extending toward the other face of the plate, said optical switching means including mirror means movable between one position at which the mirror means reflects substantially all of the light in the third beam in the direction toward the face of the plate facing the object and a second position at which the mirror means reflects substantially all of the light in the third beam in the direction toward the other face of the plate; and reference lens means in the path of the third beam for causing said third beam to diverge.

8. A device as in claim 7, wherein said mirror means includes a reflecting surface movable between two angles corresponding to the two positions.

* * * * *